United States Patent
Foucher et al.

(10) Patent No.: US 7,685,712 B2
(45) Date of Patent: Mar. 30, 2010

(54) METHOD FOR REPAIRING A RUBBING SURFACE OF A TURBOMACHINE VARIABLE-PITCH BLADE

(75) Inventors: Christelle Foucher, Acigne (FR); Claude Marcel Mons, Savigny le Temple (FR); Michel Ruimi, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/331,165

(22) Filed: Jan. 13, 2006

(65) Prior Publication Data

US 2006/0165517 A1 Jul. 27, 2006

(30) Foreign Application Priority Data

Jan. 27, 2005 (FR) .................. 05 00836

(51) Int. Cl.
*B23P 15/02* (2006.01)
(52) U.S. Cl. .................. 29/889.6; 29/889.7; 29/402.18; 204/224 R
(58) Field of Classification Search ................ 29/889.1, 29/889.7, 402.06, 402.13, 402.18; 204/224 R, 204/225, 237
See application file for complete search history.

(56) References Cited

U.S. PATENT DOCUMENTS

| | | | | | |
|---|---|---|---|---|---|
| 5,015,340 | A | * | 5/1991 | Colombier et al. | 205/138 |
| 5,382,343 | A | * | 1/1995 | Zwerner | 204/224 R |
| 5,643,434 | A | * | 7/1997 | Benmalek et al. | 205/109 |
| 5,813,118 | A | | 9/1998 | Roedl et al. | |
| 5,972,424 | A | * | 10/1999 | Draghi et al. | 427/142 |
| 6,099,711 | A | * | 8/2000 | Dahms et al. | 205/101 |
| 6,203,847 | B1 | * | 3/2001 | Conner et al. | 427/142 |
| 6,609,894 | B2 | * | 8/2003 | Jackson | 416/224 |
| 6,725,540 | B2 | * | 4/2004 | Bose et al. | 29/889.1 |
| 2002/0197152 | A1 | | 12/2002 | Jackson et al. | |
| 2004/0031140 | A1 | | 2/2004 | Arnold et al. | |

FOREIGN PATENT DOCUMENTS

| | | |
|---|---|---|
| EP | 0 129 338 | 12/1984 |
| EP | 1 197 573 A2 | 4/2002 |
| EP | 1 439 308 A1 | 7/2004 |
| EP | 1 500 791 A1 | 1/2005 |

OTHER PUBLICATIONS

U.S. Appl. No. 12/110,592, filed Apr. 28, 2008, Foucher, et al.

* cited by examiner

*Primary Examiner*—Rick K Chang
(74) *Attorney, Agent, or Firm*—Oblon, Spivak, McClelland, Maier & Neustadt, L.L.P.

(57) ABSTRACT

Method for repairing a rubbing surface of a variable-pitch blade of a turbomachine, consisting in filling a deficit of material of said surface of the blade that results from wear thereof by depositing a metallic product by electrolysis then in forming at least one thin layer of a hard material with a low coefficient of friction onto the deposited metallic product and on the surrounding part of said surface.

23 Claims, 3 Drawing Sheets

METHOD FOR REPAIRING A RUBBING SURFACE OF A TURBOMACHINE VARIABLE-PITCH BLADE

The present invention relates to a method for repairing a surface of a variable-pitch blade for a turbomachine, particularly for an aircraft turbine engine, and also relates to a variable-pitch blade intended to be guided in rotation in guide means which are liable somewhat rapidly to damage the surface of the blade with which these guide means are in contact.

BACKGROUND OF THE INVENTION

It has been found that the surface of a blade which is in contact with a guide washer mounted around the cylindrical shank of the blade, between this surface of the blade and the turbomachine casing, could quite rapidly develop a relatively significant amount of wear when this guide washer has an annular boss on its face in contact with the aforementioned surface or "mounting plate" of the blade.

This annular boss is actually liable to wear away the surface of the mounting plate of the blade and form an annular groove therein, after which the entire surface of the guide washer will rub against the mounting plate of the blade and degrade it through wear.

This results in a risk of contact between the trailing edge of the blade and the turbomachine casing, which entails removing and replacing the variable-pitch blade. Such an operation is lengthy and expensive.

When the variable-pitch blade is made of austenitic steel and the guide washer is made of martensitic steel, this phenomenon of wearing of the blade mounting plate may occur rapidly and present a major problem.

OBJECTS AND SUMMARY OF THE INVENTION

The object of the present invention is to afford a simple, effective and economical solution to this problem.

The present invention to that end proposes a method for repairing a surface of a variable-pitch blade for a turbomachine such as an aircraft turbine engine, wherein, with this surface being a rubbing surface and exhibiting a deficit of material as a result of wear thereof, the method consists in filling this deficit of material by depositing a metallic product using electrolysis, then in forming at least one thin layer of a hard material with a low coefficient of friction on the deposited metallic product and on the surrounding part of said surface.

This repair makes it possible on the one hand to make the variable-pitch blade that has suffered premature wear under the aforementioned conditions reusable and, on the other hand, to sufficiently increase its service life, by virtue of the protection afforded by the thin layer of hard material, so that it no longer presents any risk between the regular maintenance inspections of the turbomachine.

The metallic hard-facing product may, according to the invention, be deposited on the worn surface of a blade by buffer electrolysis or by bath electrolysis or alternatively by bath electrolysis in miniature, then using a small amount of electrolytic solution, just enough to cover only or practically only the worn surface of the blade.

A significant advantage with this method of metal deposition by electrolysis is that there is no essential need to machine the worn surface of the blade beforehand.

The protective hard material deposited in a thin layer on the metallic hard-facing material may be deposited by hot spraying, for example using a plasma or HVOF (High Velocity Oxygen Fuel) or other process, or by PVD (Physical Vapour Deposition) or alternatively by buffer electrolysis, once the metallic hard-facing material has been ground.

This hard material is advantageously harder than the material of the guide washer and is, for example, based on nickel, cobalt, tungsten or chromium or a combination of these elements such as nickel-cobalt, nickel-tungsten or cobalt-tungsten.

The invention also proposes a variable-pitch blade for a stator stage of a turbomachine, particularly an aircraft turbine engine, the blade being guided in rotation about its axis in a duct of a casing of the turbomachine and at its radially outermost end comprising a surface bearing against an annular boss of a guide washer mounted around a cylindrical shank of the blade between said surface and the turbomachine casing, wherein that part of the surface of the blade that is in contact with the annular boss of the washer is covered with a thin layer of hard material having a low coefficient of friction.

This blade is thus well protected against wear to its mounting plate by the guide washer and has a long service life.

It may either be a new blade, made in particular of austenitic steel and guided by a washer made of martensitic steel, and the mounting plate of which is protected by a thin layer of a material harder than that of the guide washer, or may be a blade which has been repaired by carrying out the above-described method and which can be returned to service with a sufficient life.

BRIEF DESCRIPTION OF THE DRAWINGS

The invention will be better understood and other advantages, details and characteristics of the invention will become apparent from reading the following description given by way of non-limiting example with reference to the attached drawings in which.

MORE DETAILED DESCRIPTION

Figure 1:
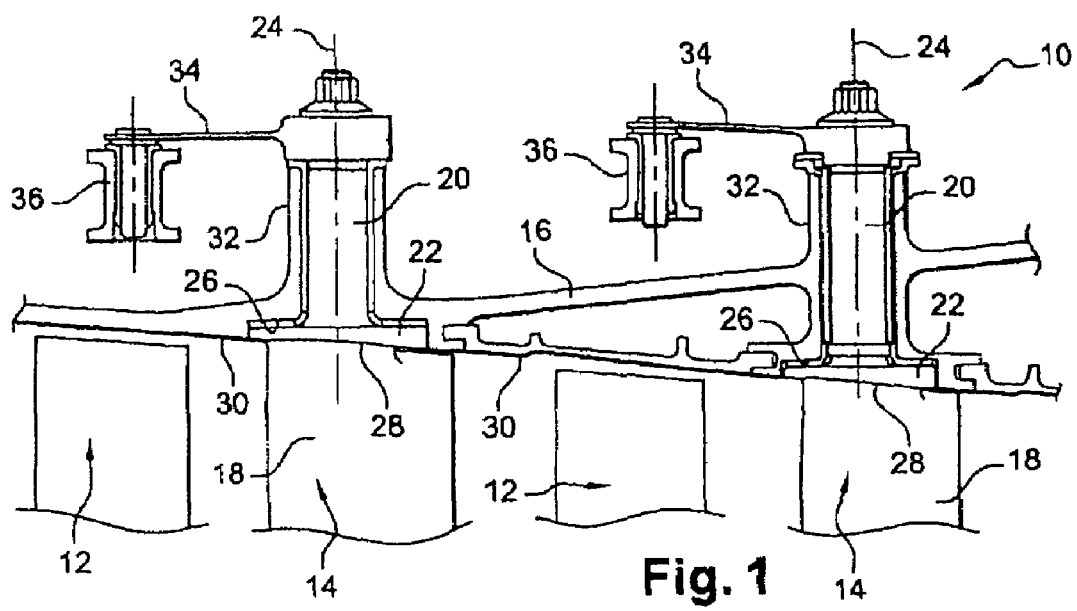
FIG. 1 is a partial schematic view in axial section of a turbomachine high-pressure compressor.

FIG. 1 schematically depicts, in axial section, part of a high-pressure compressor 10 of a turbomachine, particularly an aircraft turbine engine, of the multi-stage type, each stage comprising an annular row of moving blades 12 borne by the rotor (not depicted) of the turbomachine and an annular row of fixed blades 14 forming stator blades borne by a turbomachine stator casing 16, the angular orientation of the blades 14 being adjustable so as to optimize the flow of gas through the compressor 10.

Each blade 14 comprises an aerofoil 18 and a radially external cylindrical shank 20 which are connected by a disc or "mounting plate" 22 running at right angles to the axis 24 of the blade in a corresponding housing 26 of the casing 16, the radially innermost surface 28 of the disc being aligned with the internal wall 30 of the casing so as not to impede the flow of gas.

The cylindrical shank 20 of each blade 14 extends inside a radial cylindrical duct 32 of the casing 16 and its radially outermost end is connected by a link rod 34 to a control ring 36 which surrounds the casing 16 and is associated with actuating means (not depicted) to turn it in one direction or the other about the longitudinal axis of the casing 16 in order to rotate the blades 14 of one annular row about their axes 24.

Figure 2:
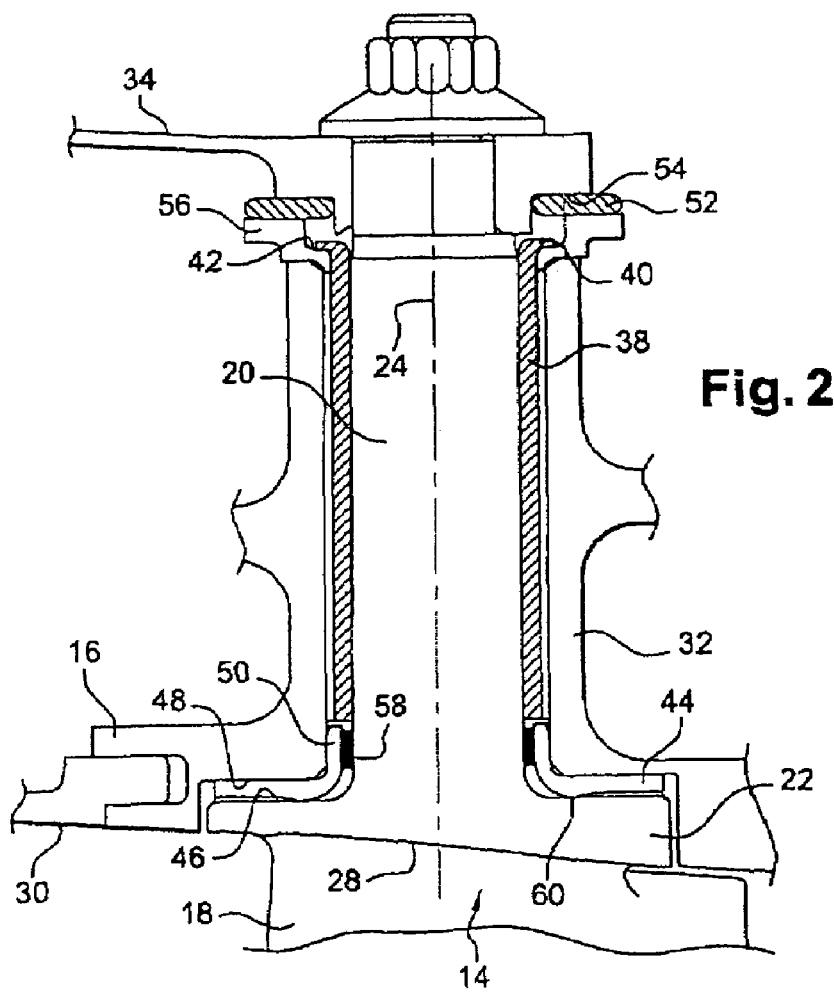
FIG. 2 is a partial view of FIG. 1 on a larger scale.

As can be seen best in FIG. 2, the cylindrical shank 20 of the blade 14 is centred and guided in rotation in the cylindrical duct 32 by means of a cylindrical bushing 38 extending in the duct 32 over the majority of the radial dimension of the shank 20 and its radially outermost end comprising an external annular rim 40 bearing against a corresponding shoulder 42 of the duct.

A first guide washer 44 is mounted around the shank 20 between the radially outermost annular surface 46 of the mounting plate 22 and a corresponding annular surface 48 of the casing 16 and on its internal edge comprises a radially external cylindrical rim 50 extending around the shank 20, more or less over its radially internal part not covered by the bushing 38.

A second guide washer 52 is mounted between an annular surface 54 of the end of the link rod and an external annular rim 56 of the duct.

The washer 44 is in contact via its rim 50 with a ring 58 shrink-fitted onto the radially innermost end of the shank 20. An annular boss 60 is formed on its radially innermost face and bears against the radially outermost annular surface 46 of the mounting plate 22.

Figure 3:
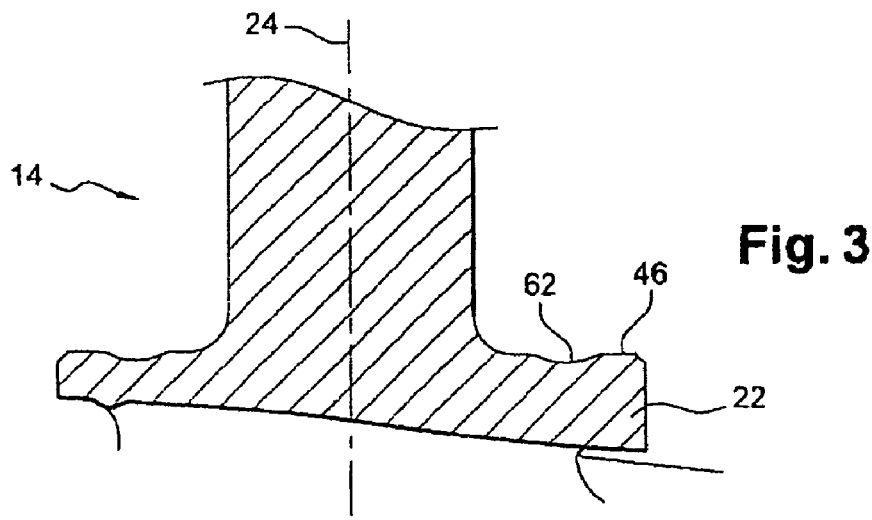
FIG. 3 is a partial schematic view in axial section of a turbomachine variable-pitch blade, the mounting plate of which is worn.

When the turbomachine is running and when the blades 14 are shifted angularly, these annular bosses 60 rub against the mounting plates 22 and form annular grooves 62 therein as depicted schematically in FIG. 3.

The subject of the present invention is a method for repairing a blade mounting plate 22 that exhibits a deficit of material as a result of wear thereof.

The method consists in filling this deficit of material by depositing a metallic product by electrolysis, then in forming at least one thin layer of a hard material having a low coefficient of friction on this metallic product and on the surrounding part of the mounting plate 22.

Figure 4:
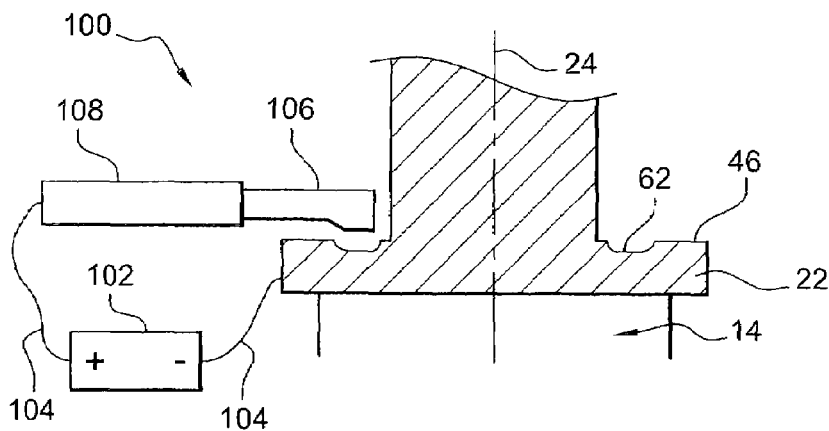
FIGS. 4 to 6 schematically depict means for implementing a first step in the method according to the invention.
Figure 5:
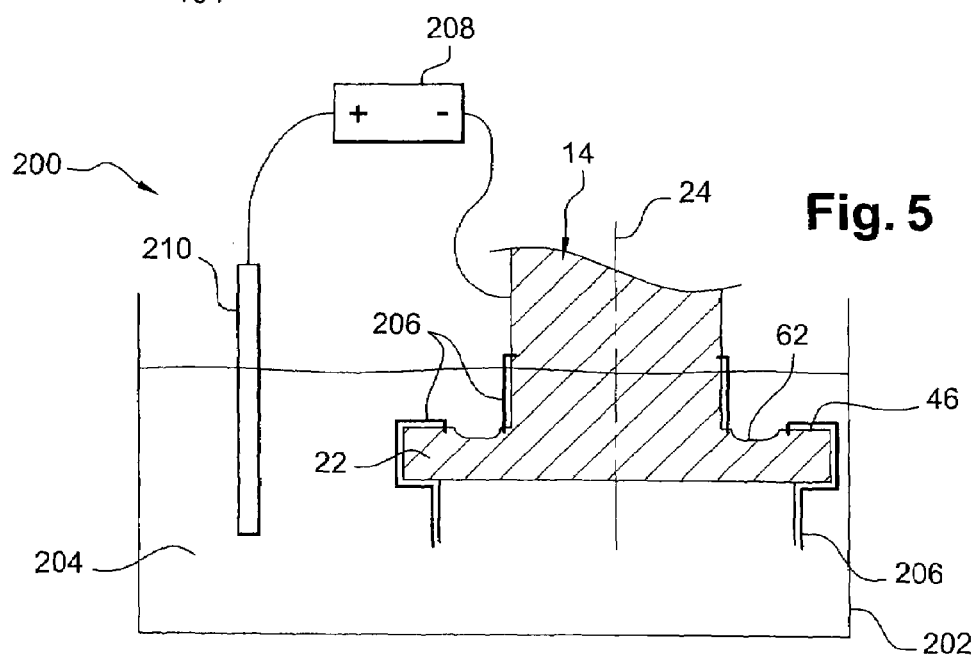
Figure 6:
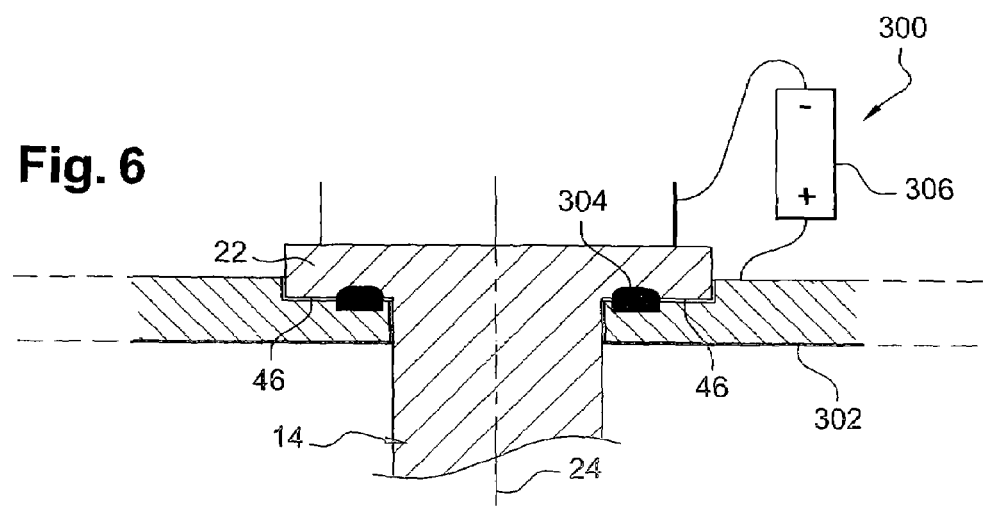

The metallic product can be deposited by electrolysis in various different ways as depicted in FIGS. 4 to 6.

In FIG. 4, the metallic hard-facing product is deposited by buffer electrolysis using a device 100 comprising an electric power source 102 connected by wires 104 to the blade 14 that forms the cathode, and to a buffer 106 which forms the anode and is impregnated with an electrolytic solution and is intended to be moved along inside the annular groove 62 that is to be filled.

The buffer 106 is, for example, a graphite electrode and its geometry and size are tailored to the shape and size of the wear, the electrolytic solution used being, for example, nickel sulphamate so as to fill the deficit of material using the nickel-based material.

This operation may be performed either by hand, the device comprising a handgrip 108, or automatically, using an automatically controlled system.

In FIG. 5, the metallic hard-facing product is deposited by bath electrolysis by means of the device 200 comprising a vat 202 filled with an electrolytic solution 204 in which a blade 14 is at least partially immersed, of which blade only that part of the mounting plate 22 that exhibits a deficit of material is in contact with the electrolytic solution 204, the remainder of the blade 14 being protected by appropriate means 206 such as sticky tape.

The blade 14 is connected to an electrical power source 208 to form the cathode, and an electrode 210 is immersed in the electrolytic solution 204 and connected to the power source 208 to form the anode.

It is also possible to use a graphite electrode 210 and nickel sulphamate by way of electrolytic solution.

In FIG. 6, the metallic product is deposited by bath electrolysis in miniature using a device 300 comprising a tank 302 which is shaped to accept at least a blade 14 and an electrolytic solution 304 which is in contact with this blade only at that part of the surface 46 that exhibits a deficit of material. An electric power source 306 is connected to each blade 14 to form the cathodes and to the tank 302 to form the anode.

The metallic product deposited on the mounting plate 22 is preferably ground, using appropriate means, before a thin layer of hard material having a low coefficient of friction is deposited, so as to improve the binding of the thin layer to the metallic product.

The thin layer of hard material may also be deposited by buffer electrolysis, the electrolytic solution being chosen in such a way as to form, on the metallic product and on the surrounding part of the mounting plate 22, a layer of material having a hardness higher than that of the metallic product and higher than that of the guide washer 44. Such materials are, for example, based on cobalt, nickel-cobalt, nickel-tungsten or cobalt-tungsten.

Several layers of hard material may be deposited on the metallic product, the outermost layer intended to be in contact with the boss of the washer 44 being chosen to limit friction against this boss and, for example, being based on chromium.

As an alternative, the thin layer of hard material is formed by hot spraying, for example using a plasma or HVOF (High Velocity Oxygen Fuel) or other process, or by PVD (Physical Vapour Deposition) and is based on cobalt, tungsten carbide, chromium carbide or some other material.

The thin layer of hard material may also be subjected to a grinding operation in order to eliminate any possible surface defects.

The thickness of the thin layer of hard material deposited on the metallic product is typically between 40 and 50 µm.

The present invention also relates to a variable-pitch blade 14 of a turbomachine stator stage exhibiting, on its mounting plate 22, a thin layer of hard material having a low coefficient of friction deposited using one of the aforementioned techniques.

Figure 7:
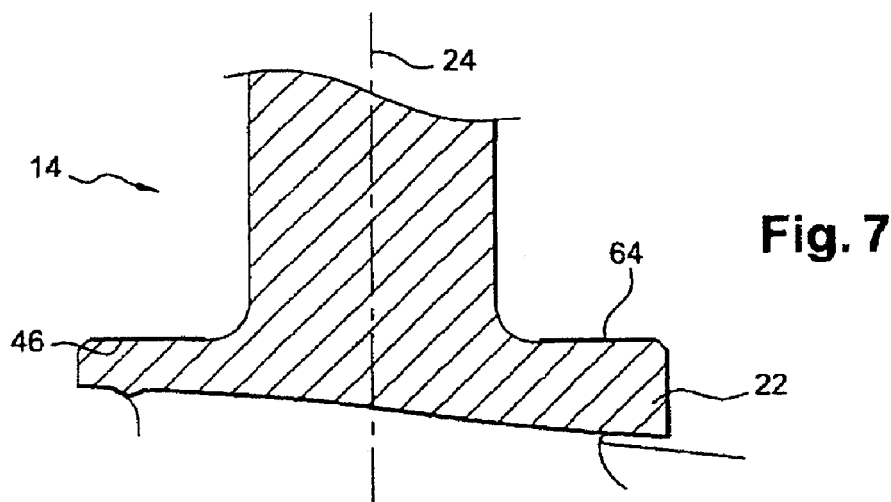
FIG. 7 is a partial schematic view in section of a new blade the mounting plate of which comprises a layer of hard material with a low coefficient of friction.
Figure 8:
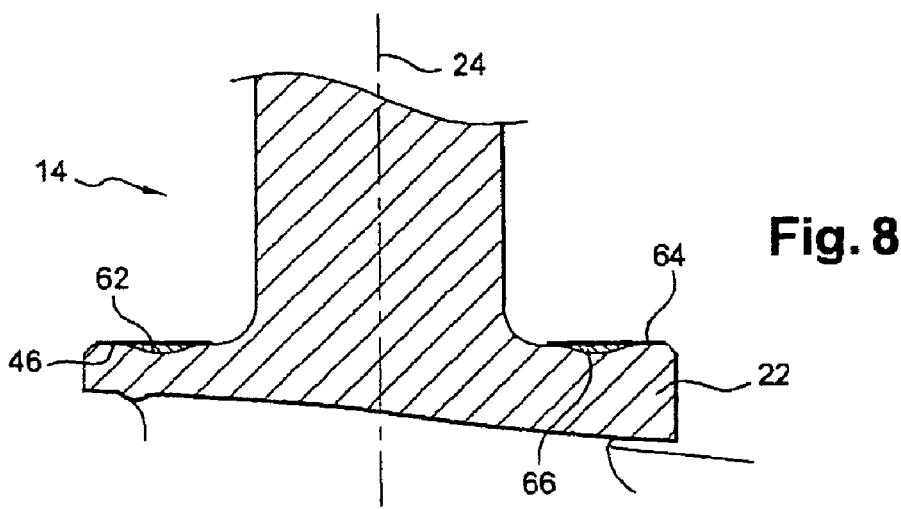
FIG. 8 is a view corresponding to FIG. 3 and depicts the mounting plate of the blade repaired using the method according to the invention.

In FIG. 7, this thin layer 64 has been deposited directly onto the mounting plate 22 of a new blade 14 and, in FIG. 8, this thin layer 64 has been formed on a metallic hard-facing product 66 deposited by one of the aforementioned techniques in an annular groove 62 of the mounting plate of a worn blade 14.

Protecting a new blade lengthens its service life enough to avoid any risk of an incident up to the time of the first routinely planned maintenance inspection.

The invention claimed is:

1. A method for repairing a worn surface of a variable-pitch blade for a turbomachine, said surface being a rubbing surface and exhibiting a deficit of material as a result of wear thereof, the method comprising:

filling said deficit of material by depositing a metallic product using electrolysis, said metallic product being deposited on said surface of the blade by buffer electrolysis performed by providing a single buffer electrode made of graphite which is impregnated with an electrolytic solution and which is moved along inside said deficit, then forming at least one thin layer of a hard material with a low coefficient of friction on the deposited metallic product and on the surrounding part of said surface, wherein said thin layer of said hard material is an outer layer that forms a new rubbing surface of said variable-pitch blade, and wherein said thin layer of said hard material has a hardness higher than that of the deposited metallic product.

2. A method according to claim 1, wherein the metallic product is deposited on said surface of the blade by bath electrolysis.

3. A method according to claim 1, wherein the metallic product is deposited on said surface of the blade by bath electrolysis in miniature, the electrolytic solution covering only or almost only that region of the surface that exhibits a deficit of material.

4. A method according to claim 1, wherein the deposited metallic product contains nickel.

5. A method according to claim 4, wherein said hard material comprises cobalt.

6. A method according to claim 4, wherein said hard material comprises tungsten.

7. A method according to claim 4, wherein said step of forming at least one thin layer comprises forming a plurality of layers on said deposited metallic product, wherein an outermost layer is said outer layer and comprises chromium.

8. A method according to claim 7, wherein at least at least one of the plurality layers formed on said deposited metallic product, other than said outer layer, comprises at least one of cobalt and tungsten.

9. A method according to claim 1, wherein nickel sulphamate is used by way of electrolytic solution.

10. A method according to claim 1, wherein the deposited metallic product is grounded before said thin layer of hard material is formed thereon.

11. A method according to claim 1, wherein the thin layer of hard material is formed by buffer electrolysis or by thermal spraying, for example of the plasma or HVOF type, or by PVD.

12. A method according to claim 1, wherein the thin layer of hard material is based on nickel, cobalt, tungsten or chromium, or on a combination of these elements including nickel-cobalt, nickel-tungsten or cobalt-tungsten.

13. A method according to claim 1, wherein the thin layer has a thickness of between 40 and 50 µm.

14. A method according to claim 1, wherein said method is free of any step of machining said blade before said filling step.

15. A method according to claim 1, wherein said filling of said deficit of material with said metallic product is performed directly on said surface of said variable-pitch blade.

16. A method according to claim 1, wherein said filling of said deficit of material with said metallic product is performed by contacting only a portion of a mounting plate of said blade where said deficit is located with an electrolytic solution.

17. A method according to claim 16, wherein said filling of said deficit of material with said metallic product is performed by dipping said mounting plate in a bath of said electrolytic solution.

18. A method according to claim 17, wherein said filling of said deficit of material with said metallic product is performed while keeping a shank portion of said blade out of said electrolytic solution.

19. A method according to claim 18, wherein said filling of said deficit of material with said metallic product is performed while keeping an airfoil portion of said blade in said electrolytic solution and protecting said airfoil portion from contacting said electrolytic solution.

20. A method according to claim 18, wherein said protecting is performed by applying sticky tape to said airfoil portion before dipping said airfoil portion in said electrolytic solution.

21. A method according to claim 1, wherein said electrolytic solution is nickel sulphamate.

22. A method according to claim 1, wherein said hardness of said hard material is higher than that of a part of the turbomachine, wherein said part rubbed said worn rubbing surface thereby forming said deficit of material and wherein said part is to rub against said new rubbing surface after said worn rubbing surface is repaired.

23. A method according to claim 1, wherein the blade comprises austenitic steel.

* * * * *